(12) United States Patent
Ahola (10) Patent No.: US 10,009,977 B2
(45) Date of Patent: Jun. 26, 2018

(54) LEARNING LUMINAIRE, AND A LEARNING CONTROL DEVICE FOR A LUMINAIRE, USING FUZZY LOGIC

(71) Applicant: Helvar Oy Ab, Espoo (FI)

(72) Inventor: Jukka Ahola, Helsinki (FI)

(73) Assignee: Helvar Oy AB, Espoo (FI)

( * ) Notice: Subject to any disclaimer, the term of this patent is extended or adjusted under 35 U.S.C. 154(b) by 0 days. days.

(21) Appl. No.: 15/352,767

(22) Filed: Nov. 16, 2016

(65) Prior Publication Data

US 2017/0142808 A1 May 18, 2017

(30) Foreign Application Priority Data

Nov. 18, 2015 (EP) ...................................... 15195148

(51) Int. Cl.
*H05B 37/02* (2006.01)
*H05B 33/08* (2006.01)

(52) U.S. Cl.
CPC ..... *H05B 37/0227* (2013.01); *H05B 33/0845* (2013.01); *H05B 37/0218* (2013.01); *H05B 37/0272* (2013.01)

(58) Field of Classification Search
CPC ............ H05B 37/0218; H05B 37/0227; H05B 37/0245; H05B 37/0272; H05B 37/0281
USPC ........................................ 315/152, 307, 312
See application file for complete search history.

(56) References Cited

U.S. PATENT DOCUMENTS

| | | | | |
|---|---|---|---|---|
| 5,811,942 A * | 9/1998 | Pedretti | .................. | H05B 37/02 315/158 |
| 8,922,124 B2 * | 12/2014 | Reed | ....................... | H05B 37/02 315/152 |
| 9,538,621 B2 * | 1/2017 | Juslen | ................. | H05B 37/0218 |
| 2012/0026726 A1 * | 2/2012 | Recker | ....................... | F21K 9/13 362/157 |
| 2012/0080944 A1 * | 4/2012 | Recker | ....................... | H02J 9/02 307/25 |
| 2012/0091895 A1 | 4/2012 | De Groot | ....................... | 315/130 |
| 2017/0127494 A1 * | 5/2017 | Johnson | ............. | H05B 37/0218 |

FOREIGN PATENT DOCUMENTS

EP          2 919 562 A1    9/2015

OTHER PUBLICATIONS

IEEE Std 802.11-2012, "Local and Metropolitan Area Networks—Specific Requirements", Section 4, © 2012 IEEE, 48 pgs.

* cited by examiner

Primary Examiner — Tung X Le
(74) Attorney, Agent, or Firm — Harrington & Smith (57) ABSTRACT

A control device of a luminaire includes a controller for controlling operation of the luminaire, which assumes a certain target lighting level as a response to a triggering local input signal. Through a communications module the device is configured to receive indication messages from the other devices. An adaptation module adjusts the operation of the control means in accordance with received indication messages. A relationship strength is determined, pertinent to a particular other device and indicative of regularity at which triggering local input signals have been observed after first receiving an indication message from said other device. The controller is reprogrammed to make the luminaire assume a preparatory lighting level as a response to receiving an indication message from said other device, the preparatory lighting level being dependent on the determined relationship strength.

14 Claims, 3 Drawing Sheets

|  | FEW | SOME | MANY |
|---|---|---|---|
| IMMEDIATE | 0.1 | 0.9 | - |
| ACTIVE | - | 0.4 | 0.6 |
| PASSIVE | 0.75 | 0.25 | - |

Fig. 6

|  | FEW | SOME | MANY |
|---|---|---|---|
| IMMEDIATE | 1.0 | - | - |
| ACTIVE | 1.0 | - | - |
| PASSIVE | 0.6 | 0.4 | - |

LEARNING LUMINAIRE, AND A LEARNING CONTROL DEVICE FOR A LUMINAIRE, USING FUZZY LOGIC

FIELD OF THE INVENTION

The example embodiments of the present invention relate to automatically adapting the operation of a luminaire in accordance with information received from other luminaires and other devices and/or with information obtained from its environment. In particular the example embodiments relate to the task of determining, how strongly the luminaire should react to information received from a particular other luminaire.

BACKGROUND OF THE INVENTION

The European patent publication EP2919562 describes a learning luminaire, a characteristic feature of which is that it can analyze status indications it receives from other luminaires, and adapt its own operation according to identified sequences of status indications that seem to occur with some kind of regularity before the luminaire itself observes the fulfillment of a triggering condition. For example, if a luminaire A observes that a particular other luminaire B often seems to transmit a message essentially telling "my sensor saw movement, I switch lights on" only a short time before luminaire A itself observes movement, it may deduce that walking users tend to appear under luminaire B first and then proceed to the area served by luminaire A. As a consequence, luminaire A may begin reacting to this kind of messages from luminaire B so that it already begins to brighten its own light, thus increasing user comfort because the user perceives the lighting system predicting his movements and lighting up his path ahead of him.

A common problem with learning luminaires of this kind is how to adapt to the varying behavior of users. Making a luminaire learn the most typical patterns is relatively easy in corridors, where users tend to walk along regular routes at regular speeds. However, the spaces served by lighting systems are often much more complicated. They may involve e.g. corridors, office rooms, work stations, storage rooms, and closets (like toilets or small, closed storage spaces), all of which require different kind of lighting.

The task of making learning luminaires adapt optimally to each environment may become difficult particularly if it is required that the system must work with minimal or no initial commissioning or configuring. Preprogramming upon installation can only prepare for assumed characteristics of the usage environment, and consequently in many cases the actually encountered characteristics of the usage environment remain unaccounted for. Furthermore, manual configuration of the luminaire may be a complex or inconvenient task that is prone to misconfiguration—and that is anyway unable to react to any subsequent changes in characteristics of the usage environment.

A prior art document US 2012/091895 discloses a network of lamps in which every lamp is coupled to a presence detector and can receive signals from other lamps in the network. A received signal indicates an activity detected by the presence detector coupled to the lamp that transmits the signal. Every lamp adjusts its light emission depending on the signal received from other lamps and the measurement of its own presence detector.

SUMMARY OF THE INVENTION

It is an objective of the present invention to provide a technique that facilitates a luminaire automatically and autonomously adapting its preprogrammed operation in response to information obtained from its operating environment.

The objectives of the invention are achieved by a control device for a luminaire, a luminaire, by a method and by a computer program as defined in the following description and in the respective independent claims.

According to a first aspect of the invention, a control device of a luminaire is provided. The control device comprises a controller for controlling operation of the luminaire. The controller is preprogrammed to make the luminaire assume a certain target lighting level as a response to a triggering local input signal.

The control device also comprises a communications module for wireless communication with other devices. The communications module is configured to receive indication messages from the other devices, and an adaptation module for adjusting the operation of the controller in accordance with received indication messages. The adaptation module is configured to determine a relationship strength, pertinent to a particular other device and indicative of regularity at which triggering local input signals have been observed after first receiving an indication message from said other device. The adaptation module is also configured to reprogram the controller to make the luminaire assume a preparatory lighting level as a response to receiving an indication message from said other device, the preparatory lighting level being dependent on the determined relationship strength.

According to a second aspect of the invention, a luminaire comprising a control device according to the first aspect of the invention is provided.

According to a third aspect of the invention, a method for operating a control device of a luminaire is provided. The method comprises determining a relationship strength, pertinent to a particular other device and indicative of regularity at which triggering local input signals have been observed after first receiving an indication message from said other device, and reprogramming a controller contained in said control device to make the luminaire assume a preparatory lighting level as a response to receiving an indication message from said other device, the preparatory lighting level being dependent on the determined relationship strength.

According a fourth aspect of the invention, a computer program for operating a control device of a luminaire is provided. The computer program includes one or more sequences of one or more instructions which, when executed by one or more processors, cause the control device at least to determine a relationship strength, pertinent to a particular other device and indicative of regularity at which triggering local input signals have been observed after first receiving an indication message from said other device, and reprogram a controller contained in said control device to make the luminaire assume a preparatory lighting level as a response to receiving an indication message from said other device, the preparatory lighting level being dependent on the determined relationship strength.

The computer program according to the fourth aspect of the invention may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to the fifth aspect of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of features that are not recited. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

DETAILED DESCRIPTION

Figure 1:
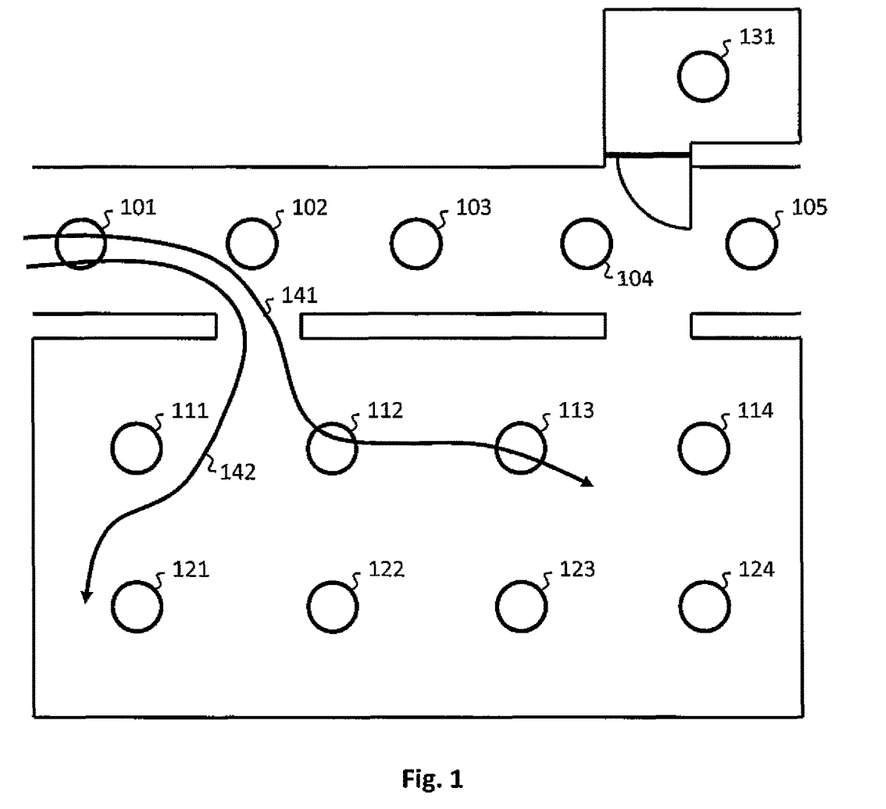
FIG. 1 schematically illustrates a lighting system in a space.

FIG. 1 illustrates schematically an example of an indoor space that is served by a lighting system. There are a total of 14 luminaires in the lighting system, of which luminaires 101, 102, 103, 104, and 105 are located in a linear corridor. Luminaires 111, 112, 113, 114, 121, 122, 123, and 124 are located in an open office room, and luminaire 131 is located in a separate closed space, which in this example is a closet behind a door along the corridor.

A plurality of the luminaires may be arranged into a lighting system for illumination of an indoor space or an outdoor area. An indoor space may be e.g. a single room, a corridor, a number of rooms possible interlinked by one or more corridors, a floor of a building in its entirety, a building in its entirety, etc. An outdoor area may be e.g. a park, a parking lot, a residential neighborhood, a street or road, a part or combination of any of these, etc. In general, the space or area served by the lighting system is typically a space/area within which an occupant may move such that at any given time he/she is likely to need light output from only a limited subset of the luminaires of the lighting system. The space or area may also be defined as one where a number of occupants may need light output from all luminaires or from a limited subset of luminaires depending on where they are and how they move within the space or area.

In this description it is assumed that there is little or no centralized control over the operation of the luminaires in the lighting system, in the sense that no centralized control system e.g. collects sensor data for the purposes of recognizing recurrent user behavior and teaching individual luminaires how to adapt. Rather, the luminaires are of the so-called standalone type, so that each luminaire collects data indicative of regularity at which certain events have been observed to occur. Based on the collected data each luminaire tries to adapt its own operation in a way that would enhance user comfort, save energy, and achieve other advantages. At most a small number of adjacent luminaires may operate together as a group, controlled by a common control device.

FIG. 1 shows two examples of paths that users have been observed to take frequently. Path 141 represents users who come through the left end of the corridor, take the first door to the open office room, and then proceed towards the distant end of the open office room. Path 142 represents users who follow the same route into the open office room but turn right and walk towards that corner of the open office room which is on the lower left in FIG. 1. From the graphical representation it is easy for a human observer to see that if luminaires are to provide predictive lighting to users, luminaire 102 should light up shortly after luminaire 101, then probably both luminaires 111 and 112 should light up at least to some extent, but thereafter only luminaire 121 or luminaire 113 should follow, depending on which route the user took this time.

Figure 2:
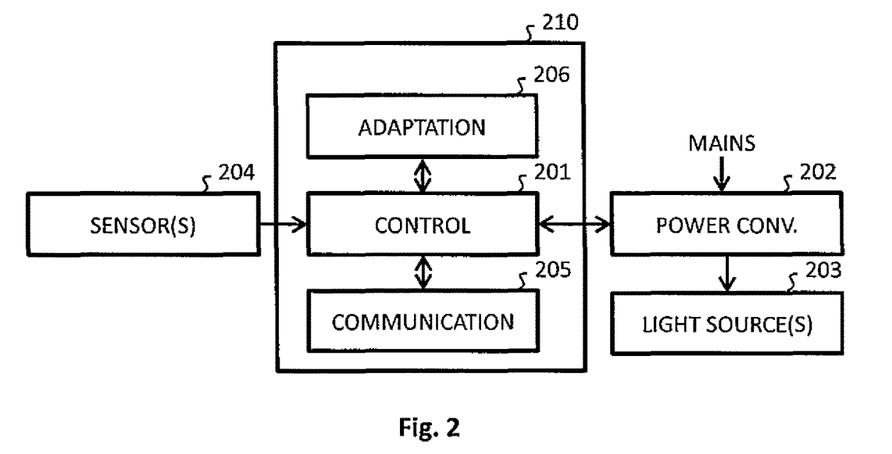
FIG. 2 schematically illustrates a luminaire and a control device for a luminaire.

The luminaires shown in FIG. 1 may have the general functional structure shown in FIG. 2. A luminaire of this kind has a controller 201 for controlling the operation of the luminaire. The entity through which the controlling of the lighting level is for example a power converter 202, which takes input power from an AC mains network (or from a DC source) and delivers regulated power to the light source(s). The controller 201 may e.g. tell the power converter 202 to use a particular PWM duty cycle between 0 and 100%, which translates into an intensity of emitted light between 0 and 100% from LEDs used as the light source(s) 203. Additionally or alternatively the controller 201 may tell the power converter 202 to deliver a steady current of a particular amperage to the light source(s).

The controller 201 may be preprogrammed to make the luminaire assume a certain target lighting level as a response to a triggering local input signal. The last-mentioned may come for example from a sensor 204, which may be for example a PIR (Passive Infra-Red) sensor for sensing user presence (or movement), in which case the controller 201 may be preprogrammed to switch the luminaire to 90% or 100% output intensity as a response to a triggering local input signal indicating that a user has entered the area served by the luminaire. The target level may be for example the level that a user has chosen with a mobile lighting control application the last time he was visiting the area served by the luminaire. The controller 201 may also be preprogrammed to make the luminaire assume a certain standby lighting level as a response to a certain time having passed without any triggering local input signal. As an example, the controller 201 may be preprogrammed to switch the luminaire to 0% or 10% output intensity, or gradually dim towards that intensity, when a certain time has passed since the last time any indication was received of users being present and needing light.

The sensor block 204 may comprise more than one sensor of more than one type, in which case said target lighting level may be dynamic. As an example, the sensor block 204 may comprise both a PIR sensor and a light sensor sensitive to ambient light, and the controller 201 may be preprogrammed to react to a presence-indicating local input signal by making the luminaire assume a target lighting level that together with the present ambient light level produces a certain measured overall intensity of light.

The luminaire may comprise a communications module 205 for wireless communication with other devices. In particular, for the purposes explained below the communications module 205 is configured to receive indication messages from other devices. However, it is reasonable to assume that the luminaire should both be able to learn from transmissions of others and be able to make transmissions to allow others to learn. Consequently the communications module 205 may also be configured to transmit indication messages, and the controller 201 may be configured to make the communications module 205 transmit an indication message in response to a triggering local input signal. An indication message is typically a message that provides some kind of indication of the status of the device that transmits the message, so it can also be called a status indication message. The status may be for example a static status like e.g. "lights off", "lights on at full power", "lights on at N % intensity" (where N is a number between 0 and 100); or a dynamic status that involves action, like "in the process of turning lights on to N% intensity" or "in the process of dimming lights to N% intensity"; or just an announcement of observations made, like "movement observed", or the like.

Yet another part shown in FIG. 2 is an adaptation module 206 for adjusting the operation of the controller 201 in accordance with received indication messages. The controller 201 and the adaptation module 206 may be implemented as various combinations of hardware and software; as an example, they may both be essentially programmable software processes stored in a program memory of one or more processors. Further considerations about suitable physical implementations of blocks of the kind shown in FIG. 2 can be found in e.g. the patent publication EP2919562 mentioned above in the description of prior art.

The luminaire may further comprise a number of additional components not depicted in the schematic illustration of FIG. 2, e.g. a housing etc. Certain components, like for example those illustrated as blocks 201, 205, and 206, and possibly even 202 and 204, may constitute a combined entity that is commonly referred to as a control device 210, which the luminaire manufacturer installs as a single unit into the luminaire. The control device 210 may be, for example, a driver device for operating one or more light emitting diodes or an electronic ballast for operating a fluorescent lamp. Alternatively the control device 210 may be a device that has a small number of power converters 202 and their respective light sources 203 under its control, so that the user could even find it difficult to perceive some visible part of the system as a discrete luminaire.

The control device typically contains all (or at least a majority of) the programmable functionalities and intelligence that control the operation of the luminaire. Therefore, in the typical parlance of this technical field and—for clarity and brevity—also in this description it is frequently said that the luminaire does this or comprises that, while actually it is the control device that comprises the described functionalities and/or is responsible for the described actions.

The communications module 205 may comprise a wireless transceiver capable of communicating with other luminaires using a wireless communication technique or protocol. The wireless communication may be provided by using a suitable short-range wireless communication technique known in the art that enables communication over ranges from a few meters up to a few hundred meters, i.e. across the area or space illuminated using the lighting system. Examples of suitable wireless communication techniques include Bluetooth, Bluetooth Low-Energy, ZigBee, WLAN/ Wi-Fi according to a IEEE 802.11 standard, etc. Further examples include infrared communications and other non-radio-based short-range communication techniques. The choice of the short-range wireless communication for a specific embodiment of the lighting system may depend e.g. on the required communication range and/or requirements with respect to energy-efficiency of the communications module. Instead of or in addition to employing the wireless connection, wired connections between the luminaire and other luminaires of the lighting system may be applied.

Referring back to the paths 141 and 142 in FIG. 1, when the sensor of luminaire 101 detects movement and/or the presence of a user, the communications module of luminaire 101 transmits an indication message that contains an identifier of the transmitting luminaire and carries the information that the sensor of the transmitting luminaire has detected movement and/or the presence of a user. The last-mentioned information may be simply the mere occurrence of the transmission, but for the purpose of more flexible communications and possible future extensions it may be advantageous to define some information elements like codes or parameter values that, when included in an indication message, tell the receiving luminaires more exactly what made the transmitting luminaire emit the transmission.

At least the closest other luminaires, but possibly even all other luminaires of the lighting system, receive the indication message from luminaire 101. If the user moves along one of the paths 141 or 142, soon thereafter also the sensor of luminaire 102 detects movement and/or the presence of a user. As a response the communications module of luminaire 102 transmits an indication message, which is received by the other luminaires. Assuming that the user follows path 141, the same happens to luminaire 112 and then to luminaire 113.

Figure 3:
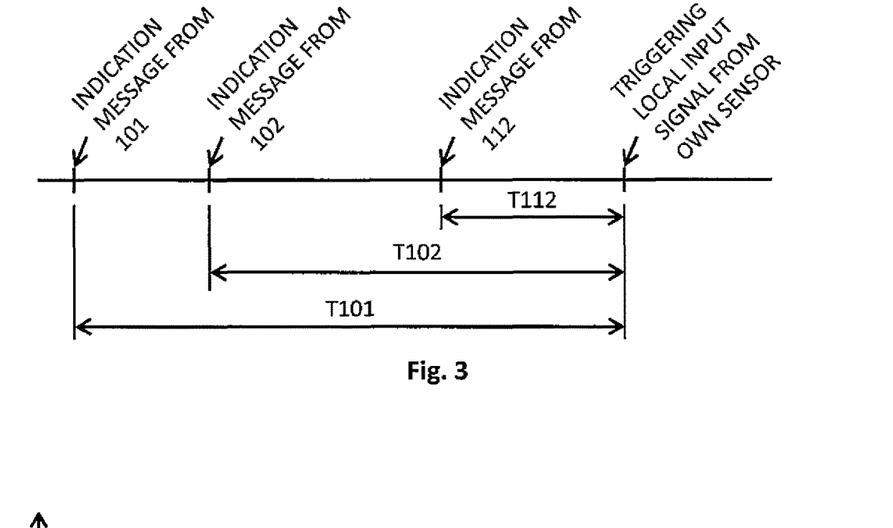
FIG. 3 schematically illustrates events at different times.

If the events observed by luminaire 113 are illustrated graphically on a time axis, they may follow the pattern shown schematically in FIG. 3. Time T101 passes between receiving the indication message from luminaire 101 and subsequently observing the triggering local input signal. A slightly shorter time T102 passes between receiving the indication message from luminaire 102 and subsequently observing the triggering local input signal, and time T112 passes between receiving the indication message from luminaire 112 and subsequently observing the triggering local input signal.

If a number of users follow the same path and similar observations are made and stored, it is probable that a number of observations of the time that passes between receiving an indication message from each of the illustrated luminaires accumulates around a luminaire-specific mean value. On the other hand, not all indication messages from the other luminaires result in a triggering local input signal at luminaire 113: some users may walk straight through the corridor, resulting in indication messages from luminaires 101 and 102 (and 103, 104, and 105) but not from 112. Some other users may follow path 142, resulting in indication messages from luminaires 101, 102, 111, and 121, and possibly even 112 (if users pass close enough it) but without eventual triggering local input signal at luminaire 113.

A so-called relationship strength can be defined, meaning a piece of relative information or a probability indicator that tells, statistically how probably an indication message received from a particular other device will be followed by a detection signal from the local sensor, and how soon. The relationship strength is pertinent to a particular other device and indicative of regularity at which triggering local input signals have been observed after first receiving an indication message from said other device. According to an embodiment of the present invention the adaptation module 206 is configured to reprogram the controller 201 to make the luminaire assume a preparatory lighting level as a response to receiving an indication message from said other device, the preparatory lighting level being dependent on the determined relationship strength.

The relationship strength is preferably determined through fuzzy logic. In the following an example is given of a particular fuzzy logic method, but other fuzzy logic methods could be used, taking into account that the time that passes between receiving the indication message and subsequently observing a triggering local input signal behaves essentially like a random variable. It is possible to apply the exemplary method in relation to only one other device, but in practice it is advantageous to determine a device-specific relationship strength for a number of other devices and later apply the determined relationship strengths to deciding the preparatory lighting level to be used in response to receiving indication messaged from each of such other devices.

The exemplary method begins by observing a number of events, so that each event is constituted by a received indication message from the other device and a subsequently observed triggering local input signal. A number of such previously received indication messages from the other device are classified into time windows according to the time passed between receiving the indication message and subsequently observing the triggering local input signal. The borderlines between the time windows can be selected based on e.g. knowledge of the physical distances between luminaires; a constant definition of time windows can be used; or the method may be allowed to determine the time windows dynamically be stretching or contracting a default division into time windows to pass an observed distribution of time values or by finding optimal parameter values for a parameterized division into time windows. As an example and for the purpose of illustrative explanation we may assume the following three time windows:

immediate follower: between 0 and 5 seconds
    active follower: between 5 and 10 seconds
    passive follower: between 10 and 15 seconds.

The classifying step gives the relative numbers or percentages of previously received indication messages in said time windows. Not all observed events will necessarily be classified into these time windows, so the percentages do not necessarily sum up to 100%: for example, applying the three time windows above, some events may have to be omitted from the classification because it took more than 15 seconds from the reception of the indication message to the occurrence of the triggering local input signal. In the current example we may assume for example that     28% of the indication messages that luminaire 113 received from luminaire 112 were classified in the "immediate follower" time window
    42% of the received indication messages from luminaire 112 were classified in the "active follower" time window
    15% of the received indication messages from luminaire 112 were classified in the "passive follower" time window.

To provide a comparison with a lower relationship strength we also assume that

2% of the indication messages that luminaire 113 received from luminaire 102 were classified in the "immediate follower" time window
    8% of the received indication messages from luminaire 102 were classified in the "active follower" time window
    18% of the received indication messages from luminaire 102 were classified in the "passive follower" time window.

These exemplary percentages represent the relative numbers of previously received indication messages in said time windows, and they are used as a basis for determining said relationship strength.

The next step is to convert the relative number of previously received indication messages in each time window (i.e. each percentage) into a set of descriptor values. Each of said descriptor values is a quantitative descriptor of how well the relative number of previously received indication messages matches a particular quantity class. Each set has as many descriptor values as there are quantity classes. In the terminology of fuzzy logic the quantity classes are also referred to as input membership functions.

Figure 4:
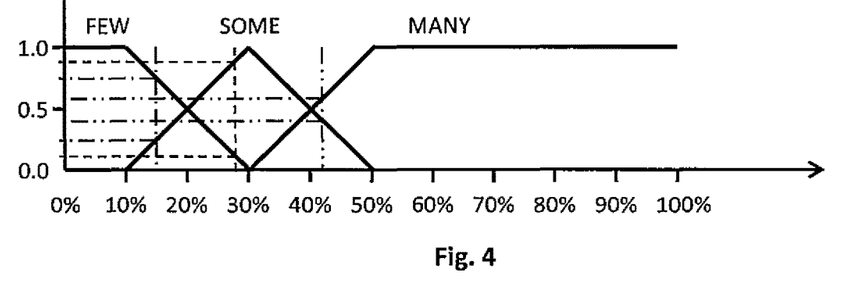
FIG. 4 schematically illustrates some examples of input membership functions.

FIG. 4 illustrates an example of three quantity classes or input membership functions that can be used to convert the relative number of previously received indication messages in each time window into a set of descriptor values. The first input membership function is called "FEW": it has a constant value 1.0 between 0% and 10%, from which it decreases linearly to 0.0 at 30%. The second input membership function is called "SOME": it increases linearly from 0.0 to 1.0 between 10% and 30% and decreases linearly back to 0.0 at 50%. The third input membership function is called "MANY": it increases linearly from 0.0 to 1.0 between 30% and 50% and stays constant at 1.0 up to 100%.

Converting the above-mentioned percentages into sets of descriptor values involves reading the value of each of said input membership functions at the argument points given by said percentages. As shown in FIG. 4, percentage 15% gives value 0.75 of the "FEW" function, value 0.25 of the "SOME" function, and value 0.0 of the "MANY" function. Percentage 28% gives value 0.1 of the "FEW" function, value 0.9 of the "SOME" function, and value 0.0 of the "MANY" function. Percentage 42% gives value 0.0 of the "FEW" function, value 0.4 of the "SOME" function, and value 0.6 of the "MANY" function. Concerning the indication messages received from luminaire 112, the conversion from the relative number of previously received indication messages in each time window into a set of descriptor values is thus     28%→[0.1, 0.9, 0.0]
    42%→[0.0, 0.4, 0.6]
    15%→[0.75, 0.25, 0.0].

Similarly concerning the indication messages received from luminaire 102, the conversion from the relative number of previously received indication messages in each time window into a set of descriptor values is     2%→[1.0, 0.0, 0.0]
    8%→[1.0, 0.0, 0.0]
    18%→[0.6, 0.4, 0.0].

The triplets in the square brackets are the sets of descriptor values that are used as a basis for determining said relationship strength. They follow the thinking of fuzzy logic in that a single, exact number is replaced with a more flexible description that has deeper descriptive power. For example, concerning the indication messages received from luminaire 112, replacing the percentage 42% of events in the "active follower" time window with the triplet [0.0, 0.4, 0.6] tells that said percentage is interpreted to mean "many events" with significance 0.6 but simultaneously it is interpreted to mean "some events" with significance 0.4, and it cannot be interpreted to mean "few events" at any significance.

Figure 5:
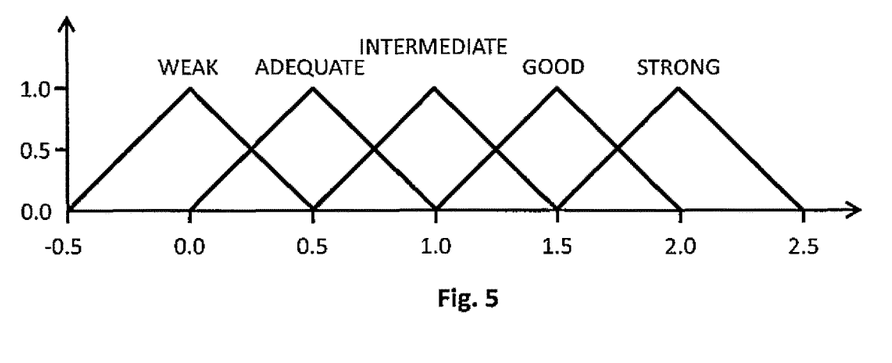
FIG. 5 schematically illustrates some examples of output membership functions.

The next step is to apply a set of selection rules to pick, from the sets of descriptor values, a specific value for each of a number of output membership functions. FIG. 5 illustrates an example of five output membership functions. They all have the form of an equilateral triangle with height 1.0 and base 1.0, their bases being located on the horizontal axis so that function "WEAK" ranges from −0.5 to 0.5, function "ADEQUATE" from 0.0 to 1.0, function "INTERMEDIATE" from 0.5 to 1.5, function "GOOD" from 1.0 to 2.0, and function "STRONG" from 1.5 to 2.5. As the names suggest, the output membership functions are already quite close to the concept of relationship strength, which the method is aiming at.

An equilateral triangle with its base equal to its height is naturally not the only possible form of an output membership function. This particular form has been selected here because it simplifies the calculations and makes the following description easier to understand. However, the same principles can be applied with arbitrary form (and number) of output membership functions.

The selection rules have been defined so that they implement a reasonable mapping from the sets of descriptor values into the different kinds of relationship strength that the output membership functions represent. What is reasonable in this respect depends on how the occurrence of events in the various time windows correlates with strength of following: it is relatively easy to understand that a large relative number of events in an "Immediate follower" time window means strong relationship, while a more even distribution of events in the various time windows means somewhat weaker relationship and the accumulation of events towards the "passive follower" time window (or the mere occurrence of only relatively few events in any of the time windows) speaks for only a weak relationship. Examples of selection rules are for example:
RULE 1: If "Immediate follower" has SOME and "Passive follower" has FEW, output is GOOD.
RULE 2: If "Active follower" has SOME and "Passive follower" has SOME, output is GOOD.
RULE 3: If "Immediate follower" has SOME and "Active follower" has SOME, output is STRONG.
RULE 4: If "Active follower" has FEW and "Passive follower" has SOME, output is ADEQUATE.

The above representation is condensed for the ease of reading; for example a complete description of RULE 1 would be: "If the set of descriptor values into which the percentage of the "Immediate follower" time window was converted includes a non-zero value read from the SOME function, and the set of descriptor values into which the percentage of the "Passive follower" time window was converted includes a non-zero value read from the FEW function, select the smaller of these non-zero values and use it as the value of the output membership function GOOD, unless some other rule gives a larger value to said output membership function." All rules in the set may have the same "minimum of input, maximum in output" characteristic, so that if a selection must be made within one rule between two descriptor values, the smaller of them is taken, while if two different rules suggest two different values for the same output membership function, the larger of them prevails.

All output membership functions have the value 0.0 to start with. Applying now the rules above to the sets of descriptor values concerning luminaire 112 (which are also shown in tabular form in FIG. 6 for the ease of reference), one gets:
From RULE 1: select the smaller of the values (0.9, 0.75) for the output membership function GOOD, i.e. GOOD=0.75
From RULE 2: select the smaller of the values (0.4, 0.25) for the output membership function GOOD, but note that GOOD already has a larger value following from RULE 1, so it remains unchanged, i.e. GOOD=0.75
From RULE 3: select the smaller of the values (0.9, 0.4) for the output membership function STRONG, i.e. STRONG=0.4
From RULE 4: note that the conditions are not met (because "Active follower" doesn't have FEW), so the rule doesn't change the value of any output functions.

Figure 6:
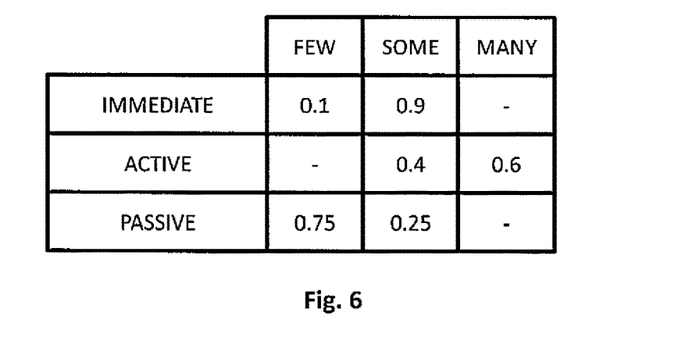
FIG. 6 depicts examples of descriptor values.

After each rule in the set of rules has been applied, the output membership functions now have the values
WEAK=0
ADEQUATE=0
INTERMEDIATE=0
GOOD=0.75
STRONG=0.4.

These are the specific values of the output membership functions that can be used as a basis for determining said relationship strength. It should be noted that the set of four rules introduced above is a simplified example. In a practical implementation it may be advantageous to write a rule for all possible combinations of non-zero descriptor values.

As a comparison, if the set of rules are applied to the sets of descriptor values concerning luminaire 102 (which are also shown in tabular form in FIG. 7 for the ease of reference), one gets:
From RULE 1, RULE 2, and RULE 3: no change to output membership function values, because at least one of the conditions in each rule is not met
From RULE 4: select the smaller of the values (1.0, 0.4) for the output membership function ADEQUATE, i.e. ADEQUATE=0.4.

Figure 7:
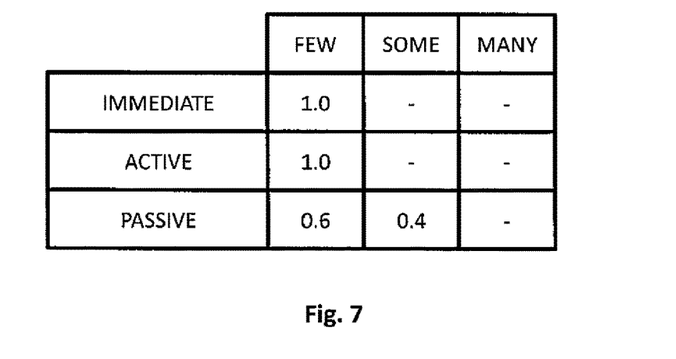
FIG. 7 depicts examples of other descriptor values.

In that case the output membership functions would have the values
WEAK=0
ADEQUATE=0.4
INTERMEDIATE=0
GOOD=0.0
STRONG=0.0.

The next step is to calculate a weighted average of said specific values of said output membership functions, wherein weights used for said weighted average represent at least the relative magnitudes of said specific values. The calculations of weighted averages are illustrated graphically in FIG. 8 (the calculation associated with the example of luminaire 112 above) and FIG. 9 (the calculation associated with the example of luminaire 102 above).

Figure 8:
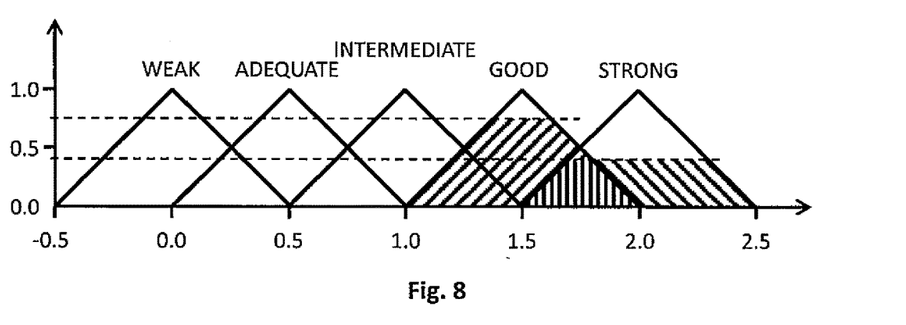
FIG. 8 schematically illustrates calculation of a weighted average.

In FIG. 8 the hatched portion of the triangular area delimited by the output membership function GOOD corresponds to the height from the x-axis to the specific value (0.75) that was picked for the output membership function GOOD in the process explained above. Similarly the hatched portion of the triangular area delimited by the output membership function STRONG corresponds to the height from the x-axis to the specific value (0.4) that was picked for the output membership function STRONG. The area indicated with the vertical hatch belongs to both hatched areas. The calculation of a weighted average proceeds as follows:
first the areas of the hatched portions of each output membership function for which a non-zero value was picked are calculated, and summed together;

the overlapping portions (like the vertically hatched area in FIG. 8) are deducted in order not to take them twice in the sum;

then each hatched portion is separately weighted by the x coordinate of the peak of the corresponding output membership function, and the sum of these weighted versions of the hatched portions is calculated the overlapping portions are deducted also from the sum of the weighted versions; the weight of the overlapping portion is the peak value of the output membership functions within the overlapping range, the final weighted average is the ratio of the sum of the weighted versions over the sum of the unweighted versions of the hatched portions.

For example in the case of FIG. 8 the area of the hatched portion of the output membership function GOOD is 0.46875 and the area of the hatched portion of the output membership function STRONG is 0.32. The area of the vertically hatched portion is 0.12. The sum of hatched areas, from which the double occurrence of the vertically hatched portion has been removed, is 0.66875. The hatched area under the output membership function GOOD weighted with the peak x-coordinate 1.5 is 0.703125, and the hatched area under the output membership function STRONG weighted with the peak x-coordinate 2.0 is 0.64. To remove the weighted version of the overlapping portion, the weight 1.75 is applied according to the x coordinate of its middle point. Calculating gives the final weighted average of approximately 1.7.

Figure 9:
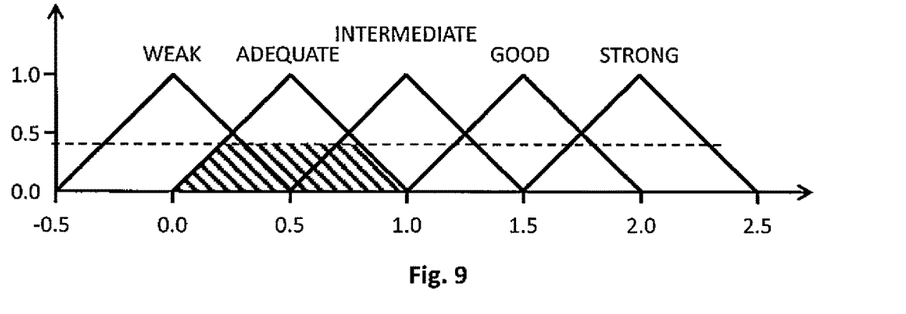
FIG. 9 schematically illustrates calculation of another weighted average.

In the example of FIG. 9 there is only one hatched portion and no overlapping portions, so the final weighted average is simply the ratio of the weighted area of the hatched portion over its unweighted area, where the weight is 0.5 according to the x-coordinate of the peak of the output membership function AVERAGE. The resulting final weighted average is 0.5.

The arrangement of output membership functions shown in FIGS. 5, 8, and 9 shows that a maximum numerical value for the final weighted average (i.e. the calculated relationship strength) is 2.0, because in the strongest possible relationship the set of rules would end up giving value 1.0 for the output membership function STRONG, which has its peak at x=2.0, and value 0.0 for all other output membership functions. Similarly the minimum numerical value for the calculated relationship strength would be 0.0, if only the output membership function WEAK (with its peak at x=0.0) would have value 1.0 and all the others 0.0. If desired, the value range [0.0, 2.0] of the calculated relationship strength can be further scaled to [0%, 100%] with simple linear scaling.

An example of using the calculated relationship strength proceeds as follows. The control device may respond to the reception of a further indication message from that other device for which the relationship strength was calculated by making the luminaire assume a preparatory lighting level that lies between a passive lighting level and the target lighting level. The relative difference between said preparatory lighting level and said passive lighting level in relation to the difference between the target lighting level and said passive lighting level would be proportional to said relationship strength.

Again referring to the two numerical examples above, we may assume that the current lighting level of luminaire 113 is a "passive" or "standby" lighting level 10% and the target lighting level is 90%. The calculated relationship strength concerning luminaire 112 is 1.7, and the calculated relationship strength concerning luminaire 102 is 0.5. If now a further indication message is received from luminaire 102, luminaire 113 assumes a preparatory lighting level that is up one quarter of the difference between 10% and 90%, i.e. 30%, because the calculated relationship strength 0.5 is one quarter of the possible value range [0.0, 2.0]. If a further indication message is received from luminaire 112, luminaire 113 assumes a preparatory lighting level 78%, because 10%+(1.7/2.0)*(90%−10%)=78%.

Comparing to FIG. 1, the examples above show that luminaire 113 reacts to an indication message from luminaire 102 relatively weakly, by only increasing its lighting level to 30%, because it is possible that the user whose detected movement triggered the indication message from 102 may not come to the open office room at all, and even if he does, he is still relatively far away. But if the luminaire 113 receives an indication message from luminaire 112, it reacts by increasing its lighting level relatively much more, because the user may well be heading the way of luminaire 113, and even if he is just turning towards luminaire 121, he may appreciate that there is some light also close to his path on the right.

As a consequence, the invention helps both to save energy and to enhance user comfort. Luminaire 113 does not increase its light output very much if the indication signal meant only a relatively low possibility of this particular user actually needing light in the middle of the open office room, so energy is saved. Enough light will still be provided to those users who really come close enough, so user comfort and satisfaction are enhanced. All this is achieved without having to execute any installation-specific commissioning: the luminaires do not need to know their mutual relations or geographical locations in advance. During a learning period, when not enough data has been gathered yet for reliably calculating the relationship strengths, it is possible that the luminaires maintain a somewhat higher lighting level and do not react so strongly to the indication messages they receive. The length of this learning period can be preprogrammed to the control devices for example as a number of active operating hours or as a number of received indication messages, or as some statistic descriptor of the accumulating database of received indication messages.

The entity that has been designated the controller in this description may be or comprise a processor, which term in turn may be understood to include one or more microprocessors and/or microcontrollers that may reside and communicate in one or more standalone and/or distributed environments, and in one or more processor-controlled devices that may be similar to or different from each other. The term may also be understood to include and/or cover a central processing unit, an arithmetic logic unit, an ASIC (application specific integrated circuit), and/or a task engine. All these examples are illustrative rather than restrictive concerning the meaning of the term.

The entity that has been designated the communications module in this description may be part of the controller or it may constitute a separate entity. It comprises at least a wireless receiver and may comprise a wireless transmitter, so that wireless means communications utilizing oscillating electromagnetic fields of any frequency and wavelength such as microwaves, radio waves, infrared, visible light, ultraviolet light, or other, and/or utilizing acoustic waves such as ultrasound or other. The communications module may comprise programmable functions of its own in the form of a processor or microcontroller, or it may involve a fixed, non-programmable hardware implementation.

The entity that has been designated the adaptation module in this description may be a processor or a programmable functionality of a processor, and it may share resources with the controller or be part of the controller. It may also be an entity separate from the controller.

The invention claimed is:

1. A control device of a luminaire comprising
a controller for controlling operation of the luminaire, the controller preprogrammed to make the luminaire assume a certain target lighting level as a response to a triggering local input signal,
a communications module for wireless communication with other devices, the communications module configured to receive indication messages from the other devices, and
an adaptation module for adjusting the operation of the controller in accordance with received indication messages;
wherein the adaptation module is configured to
determine a relationship strength, pertinent to a particular other device and indicative of regularity at which triggering local input signals have been observed after first receiving an indication message from said other device, and
reprogram the controller to make the luminaire assume a preparatory lighting level as a response to receiving a further indication message from said other device, the preparatory lighting level being dependent on the determined relationship strength.

2. A control device according to claim 1, wherein the adaptation module is configured to:
classify a number of previously received indication messages from said other device into time windows according to the time passed between receiving the indication message and subsequently observing a triggering local input signal, and
use the relative numbers of previously received indication messages in said time windows as a basis for determining said relationship strength.

3. A control device according to claim 2, wherein the adaptation module is configured to:
convert the relative number of previously received indication messages in each time window into a set of descriptor values, wherein each of said descriptor values is a quantitative descriptor of how well the relative number of previously received indication messages matches a particular quantity class, so that said set has as many descriptor values as there are quantity classes, and
use the sets of descriptor values as a basis for determining said relationship strength.

4. A control device according to claim 3, wherein the adaptation module is configured to:
apply a set of selection rules to pick, from the sets of descriptor values, a specific value for each of a number of output membership functions, and
use the specific values of said output membership functions as a basis for determining said relationship strength.

5. A control device according to claim 4, wherein the adaptation module is configured to:
calculate a weighted average of said specific values of said output membership functions, wherein weights used for said weighted average represent at least the relative magnitudes of said specific values, and
use the calculated weighted average as the value of said relationship strength.

6. A control device according to claim 1, wherein the controller is configured to:
respond to the reception of a further indication message from said other device by making the luminaire assume a preparatory lighting level that lies between a passive lighting level and said target lighting level, the relative difference between said preparatory lighting level and said passive lighting level in relation to the difference between the target lighting level and said passive lighting level being proportional to said relationship strength.

7. A control device according to claim 1, wherein
the communications module is configured to transmit indication messages, and
the controller is configured to make the communications module transmit an indication message in response to said triggering local input signal.

8. A luminaire comprising one or more light sources and a control device, the control device comprising
a controller for controlling operation of the luminaire, the controller preprogrammed to make the luminaire assume a certain target lighting level as a response to a triggering local input signal,
a communications module for wireless communication with other devices, the communications module configured to receive indication messages from the other devices, and
an adaptation module for adjusting the operation of the controller in accordance with received indication messages;
wherein the adaptation module is configured to
determine a relationship strength, pertinent to a particular other device and indicative of regularity at which triggering local input signals have been observed after first receiving an indication message from said other device, and
reprogram the controller to make the luminaire assume a preparatory lighting level as a response to receiving a further indication message from said other device, the preparatory lighting level being dependent on the determined relationship strength.

9. A method for operating a control device of a luminaire, comprising
determining a relationship strength, pertinent to a particular other device and indicative of historical regularity at which triggering local input signals have been observed after first receiving an indication message from said other device, and
reprogramming a controller contained in said control device to make the luminaire assume a preparatory lighting level as a response to receiving a further indication message from said other device, the preparatory lighting level being dependent on the determined relationship strength.

10. A method according to claim 9, comprising:
classifying a number of previously received indication messages from said other device into time windows according to the time passed between receiving the indication message and subsequently observing a triggering local input signal, and
using the relative numbers of previously received indication messages in said time windows as a basis for determining said relationship strength.

11. A method according to claim 10, comprising:
converting the relative number of previously received indication messages in each time window into a set of descriptor values, wherein each of said descriptor values is a quantitative descriptor of how well the relative number of previously received indication messages matches a particular quantity class, so that said set has as many descriptor values as there are quantity classes, and using the sets of descriptor values as a basis for determining said relationship strength.

12. A method according to claim 11, comprising:

applying a set of selection rules to pick, from the sets of descriptor values, a specific value for each of a number of output membership functions, and using the specific values of said output membership functions as a basis for determining said relationship strength.

13. A method according to claim 12, comprising:

calculating a weighted average of said specific values of said output membership functions, wherein weights used for said weighted average represent the relative magnitudes of said specific values, and using the calculated weighted average as the value of said relationship strength.

14. A non-transitory memory storing a computer program for operating a control device of a luminaire, the computer program including one or more sequences of one or more instructions which, when executed by one or more processors, cause the control device to at least perform the following:

determining a relationship strength, pertinent to a particular other device and indicative of historical regularity at which triggering local input signals have been observed after first receiving an indication message from said other device, and reprogramming a controller contained in said control device to make the luminaire assume a preparatory lighting level as a response to receiving a further indication message from said other device, the preparatory lighting level being dependent on the determined relationship strength.

* * * * *